United States Patent
Lim et al.

(10) Patent No.: US 7,239,105 B2
(45) Date of Patent: Jul. 3, 2007

(54) METHOD COMPENSATING GYRO SENSOR FOR ROBOT CLEANER

(75) Inventors: Kwang-Soo Lim, Seoul (KR); Sam-Jong Jeung, Gwangju (KR); Jeong-Gon Song, Gwangju (KR); Ki-Man Kim, Gwangju (KR); Ju-Sang Lee, Gwangju (KR); Jang-Youn Ko, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 11/073,130

(22) Filed: Mar. 4, 2005

(65) Prior Publication Data

US 2006/0076917 A1  Apr. 13, 2006

(30) Foreign Application Priority Data

Oct. 12, 2004  (KR)  .................. 10-2004-0081201

(51) Int. Cl.
*B25J 5/00*  (2006.01)

(52) U.S. Cl. ................. 318/568.12; 318/568.11; 700/258; 700/245; 701/23; 901/1

(58) Field of Classification Search .......... 318/568.11, 318/568.12; 701/23; 700/258, 245; 901/1
See application file for complete search history.

(56) References Cited

U.S. PATENT DOCUMENTS

| | | | | |
|---|---|---|---|---|
| 4,306,329 A | * | 12/1981 | Yokoi | .......... 15/319 |
| 4,674,048 A | * | 6/1987 | Okumura | .......... 701/25 |
| 5,279,672 A | * | 1/1994 | Betker et al. | .......... 134/18 |
| 5,479,079 A | | 12/1995 | Jeong et al. | .......... 318/568.12 |
| 5,646,494 A | * | 7/1997 | Han | .......... 318/587 |
| 6,025,687 A | * | 2/2000 | Himeda et al. | .......... 318/586 |
| 6,119,057 A | * | 9/2000 | Kawagoe | .......... 701/23 |
| 6,138,063 A | * | 10/2000 | Himeda | .......... 701/23 |
| 6,459,955 B1 | * | 10/2002 | Bartsch et al. | .......... 700/245 |
| 6,732,826 B2 | | 5/2004 | Song et al. | .......... 180/169 |
| 2004/0044477 A1 | * | 3/2004 | Jung et al. | .......... 702/5 |
| 2004/0128031 A1 | * | 7/2004 | Wang | .......... 700/258 |
| 2004/0156541 A1 | | 8/2004 | Jeon et al. | .......... 382/153 |
| 2004/0168148 A1 | | 8/2004 | Goncalves et al. | .......... 717/104 |

FOREIGN PATENT DOCUMENTS

| | | |
|---|---|---|
| EP | 0273976 | 5/1987 |
| EP | 0364353 | 10/1989 |
| EP | 0496538 | 1/1992 |
| EP | 0555586 | 11/1992 |

(Continued)

OTHER PUBLICATIONS

Swedish Office Action dated Sep. 30, 2005 in relation to corresponding Swedish Application No. 0500599-6.

(Continued)

*Primary Examiner*—Rita Leykin
(74) *Attorney, Agent, or Firm*—Ohlandt, Greeley, Ruggiero & Perle L.L.P.

(57) ABSTRACT

A method of compensating a gyro sensor of a robot cleaner is provided. The method includes changing to a compensation mode if a robot cleaner travels greater than a compensation reference, and compensating an output value of the gyro sensor by use of an upper camera.

12 Claims, 4 Drawing Sheets

FOREIGN PATENT DOCUMENTS

| | | |
|---|---|---|
| EP | 1435554 | 4/2003 |
| EP | 1435554 | 10/2003 |
| GB | 2376537 | 4/2002 |
| JP | 51050830 | 6/1993 |
| JP | 07-246175 | 9/1995 |
| JP | 10240342 | 9/1998 |
| JP | 2003330539 | 11/2003 |
| KR | 10-2004-0062038 | 7/2004 |
| WO | WO 01/37060 | 5/2001 |

OTHER PUBLICATIONS

Novelty Search Report from the Dutch Patent Office issued on Jul. 18, 2005 in regards to Application No. 1028641.

British Combined Search and Examination Report dated Jun. 21, 2005.

Preliminary Search Report issued on Apr. 20, 2006 from the French Patent Office with regards to corresponding French Patent Application No. 05 03284 filed on Apr. 4, 2005.

* cited by examiner

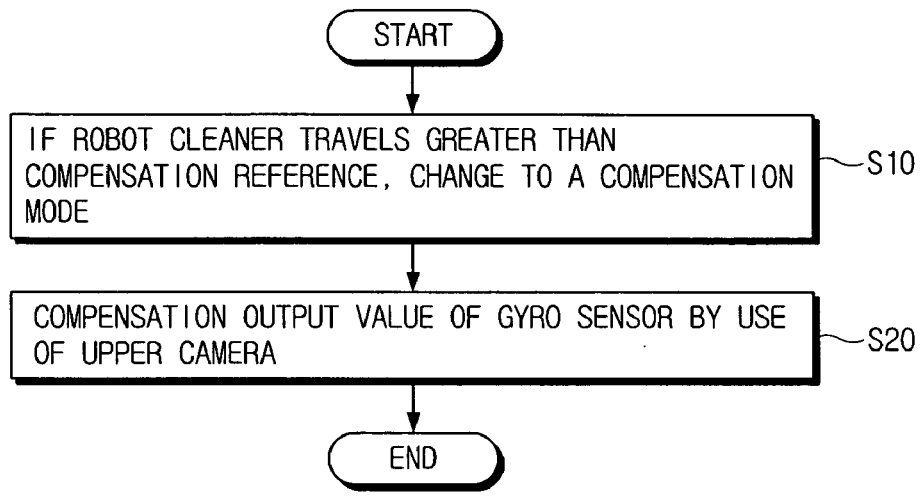
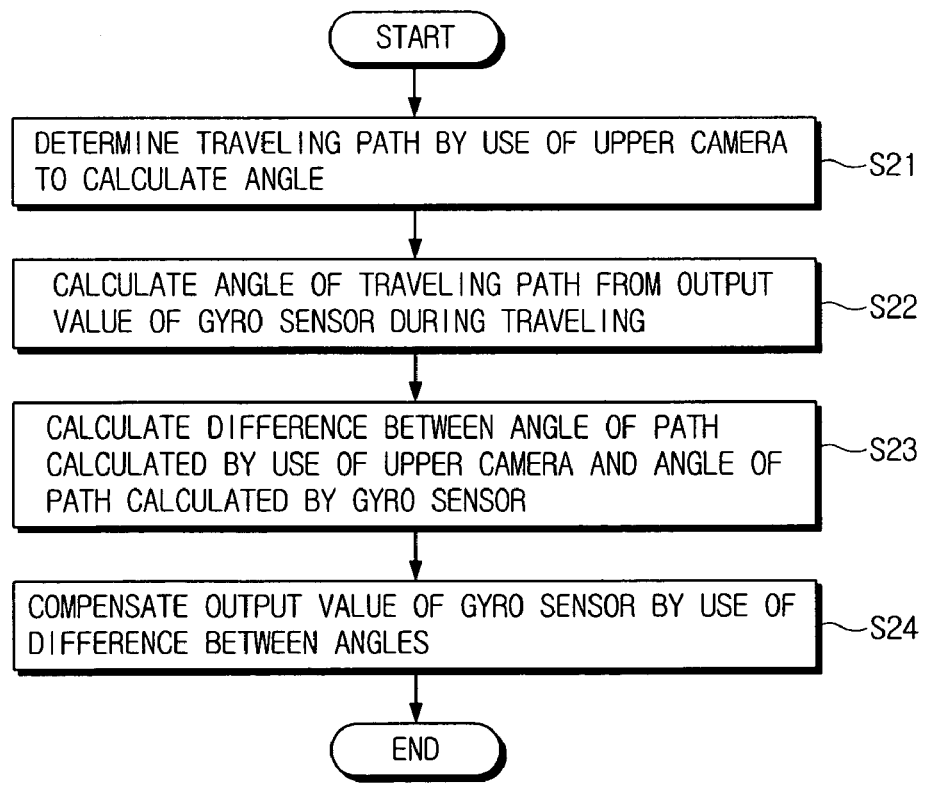

METHOD COMPENSATING GYRO SENSOR FOR ROBOT CLEANER

CROSS-REFERENCE TO RELATED APPLICATIONS

This application claims the benefit of Korean Patent Application No. 2004-81201 filed on Oct. 12, 2004, in the Korean Intellectual Property Office, the disclosure of which is incorporated herein by reference in its entirety.

BACKGROUND OF THE INVENTION

1. Field of the Invention

The present invention relates to a robot vacuum cleaner which autonomously travels, more particularly, to a method for compensating gyro sensor for robot cleaner which detects a rotation angle by using a gyro sensor.

2. Description of the Related Art

Generally, a robot cleaner travels along the outline of cleaning area enclosed with walls or obstacles by using a ultrasonic sensor of a cleaner body to determine a cleaning area or recognize a cleaning area by information input from a user. Then, the robot cleaner plans a traveling path which can efficiently clean the recognized cleaning-area. Finally, the robot cleaner controls a driving part to follow the planned traveling-path, and operates a dust-suction part to perform cleaning.

In order to travel along the planned traveling-path, a robot cleaner calculates a present position by use of an absolute coordinate or a relative coordinate which uses a traveling distance from a reference point of cleaning area and a rotation angle.

As an example of method for traveling by use of an absolute coordinate, a robot cleaner calculates the present position by use of a ceiling image photographed by a CCD camera. In specific, a robot cleaner detects installations such as a lamp, a fluorescent lamp at ceiling from the photographed ceiling image or position recognition marks for a separate position recognition to detect the present position of the robot cleaner, and travels based on the present position. However, the traveling method using CCD camera requires high efficient system and heavy expense for constructions because lots of images should be quickly processed.

A robot cleaner traveling by use of the relative coordinate comprises a traveling distance detection sensor for detecting a traveling distance and an angle sensor for detecting a rotation angle of a robot cleaner. In general, an encoder which can detect a rotation number of traveling wheel is widely used for the traveling distance detection sensor, and a gyro sensor which can detect a relative angle is widely used for the angle sensor. If the gyro sensor is applied, a robot cleaner can turn as desired angles during straight traveling, and therefore, the traveling direction of the robot cleaner can be easily controlled. The gyro sensor, however, has an error of approximate 5~10% of measured angles. The error is occurred due to a constant error based on integral calculus of gyro sensor and a change of scale factor depending on change of inner variables such as temperature and humidity. In specific, if a rotation of robot cleaner gets greater and the accumulated rotation-angle is great, the error is also accumulated such that a robot cleaner can not follow planned traveling-path. As such, some area is not cleaned enough when a robot cleaner completes traveling along the planned traveling-path.

SUMMARY OF THE INVENTION

The present invention has been conceived to solve the above-mentioned problems occurring in the prior art, and an aspect of the present invention is to provide a method of compensating a gyro sensor of a robot vacuum cleaner wherein, if the robot cleaner travels greater than a certain distance, the robot cleaner compensates an output value of the gyro sensor to be able to accurately follow a planned traveling-path.

In order to achieve the above aspects, there is provided a method of compensating a gyro sensor of a robot cleaner, comprising changing to a compensation mode if a robot cleaner travels greater than a compensation reference; and compensating an output value of the gyro sensor by use of an upper camera.

The compensation reference may be based on an accumulated angle of the robot cleaner.

The compensating comprising determining a traveling path by use of the upper camera to calculate an angle of the traveling path; calculating an angle of the traveling path from an output value of the gyro sensor during traveling the traveling path by use of the upper camera; calculating a difference between the angle of the traveling path calculated by the upper camera and the angle of the traveling path calculated by the gyro sensor; and compensating an output value of the gyro sensor by use of the difference between the both angles.

The determining the traveling path extracts a marking point corresponding to objects on a ceiling from a ceiling image photographed by the upper camera and selects a present position and a traveling destination of the robot cleaner by use of the marking point.

The traveling destination may be selected to have a certain angle with respect to the previous traveling direction of the robot cleaner. The certain angle may be less than approximately ±90°.

As described above, the robot cleaner according to the method for compensating gyro sensor of the present invention performs a compensation mode to compensate the output value of the gyro sensor if the robot cleaner travels greater than a compensation reference. Therefore, errors of the gyro sensor remain less than certain values such that the robot cleaner can accurately follow the planned traveling-path.

As such, if the robot cleaner using the method of compensating gyro sensor according to the present invention is utilized, uncleaned areas caused by errors of the gyro sensor as a conventional art will not occur.

BRIEF DESCRIPTION OF THE DRAWINGS

The above and other aspects, features and advantages of the present invention will be more apparent from the following detailed description taken with reference to the accompanying drawings, in which:

FIG. 3 is a flow chart of gyro sensor compensating method of a robot cleaner according to an embodiment of the present invention;

FIG. 4 is a flow chart of an embodiment of the compensating step in gyro sensor compensating method of robot cleaner of FIG. 3.

Figure 1:
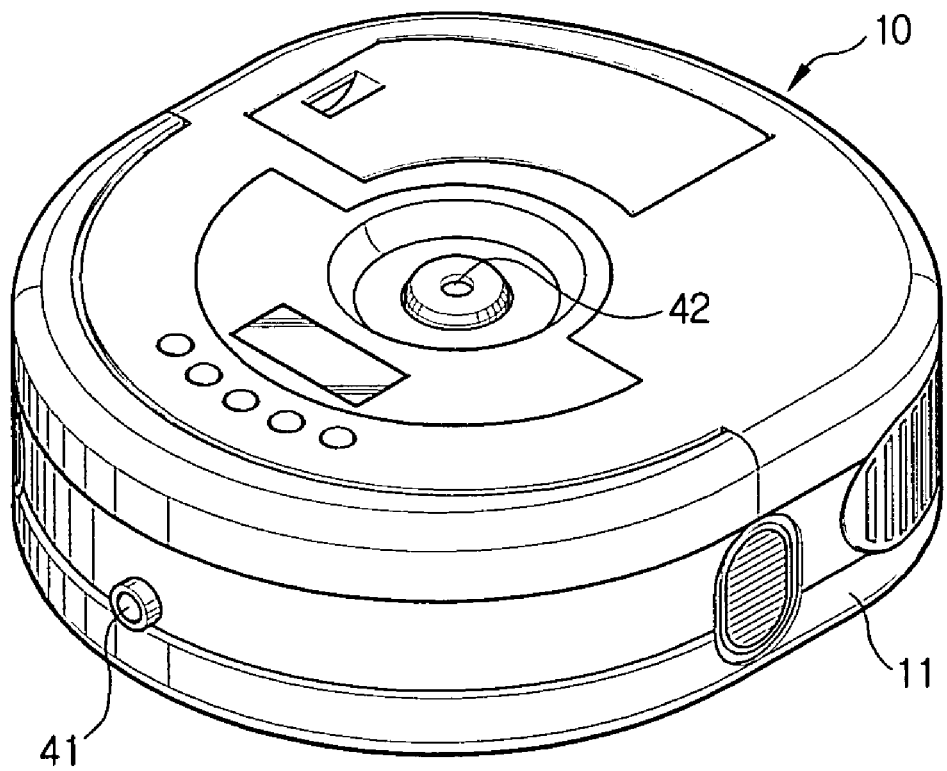
FIG. 1 is a perspective view of a robot vacuum cleaner according to an embodiment of the present invention.

DETAILED DESCRIPTION OF THE
EXEMPLARY EMBODIMENTS

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
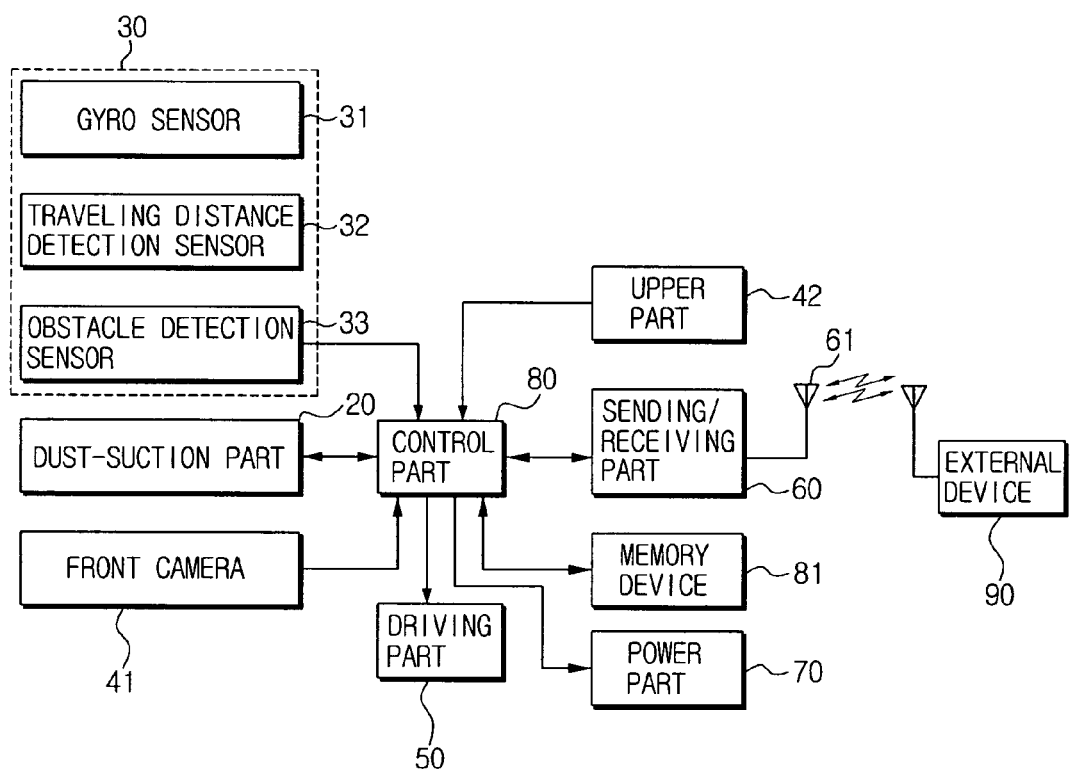
FIG. 2 is a block diagram showing function blocks of the cleaner of FIG. 1.

FIG. 1 is a perspective view of a robot vacuum cleaner whereto a gyro sensor compensating method is applied according to an embodiment of the present invention, and FIG. 2 is a block diagram showing function blocks of a robot vacuum cleaner of FIG. 1.

Referring to FIGS. 1 and 2, a robot cleaner 10 comprises a dust-suction part 20, a sensor part 30, a front camera 41, an upper camera 42, a driving part 50, a sending/receiving part 60, a power part 70, a recording device 81 and a control part 80 which are suitably arranged in a cleaner body 11.

The dust-suction part 20 may be formed in various types to draw in contaminants-laden air from cleaning floor. For example, the dust-suction part 20 can simply comprise a suction motor, a suction brush for drawing in contaminants-laden air by a suction force of the suction motor, and a dust chamber disposed between the suction motor and the suction brush. An inhalation port and exhaust port are provided in the dust chamber which are connected with the suction brush and the suction motor in fluid-communication. Contaminants-laden air is drawn in via the inhalation port and separated in the dust chamber to discharge via the exhaust port.

The sensor part 30 comprises a gyro sensor for measuring a rotation angle of robot cleaner, a traveling distance detection sensor 32 for measuring a traveling distance and a obstacle detection sensor 33 for detecting obstacles such as walls.

The gyro sensor 31 is used when the robot cleaner 10 needs to change a traveling direction. The gyro sensor 31 detects an angle of rotation, i.e., a relative angle, of the robot cleaner 10 with respect to the very previous traveling direction (hereinafter called as 'existing traveling-direction') before changing the traveling direction. Basically, the gyro sensor 31 has an error of approximately 5 to 10% (percent) of a measured angle. The error is occurred due to a constant error based on integral calculus of output value of the gyro sensor 31 and a scale factor change depending on change of inner variables such as temperature and humidity. The gyro sensor 31 detects a relative angle of rotation with respect to a certain direction such as existing traveling-direction, and therefore, if the rotation angle of the robot cleaner 10 is accumulated, error of the rotation angle of the robot cleaner caused by the error increases during use. As such, the error has to be compensated for the robot cleaner 10 to precisely follow planned path.

A rotation detection sensor, which detects a number of wheel rotations, can be applied to the traveling distance detection sensor 32. For example, an encoder, which is mounted to detect a number of motor rotations, can be utilized for the rotation detection sensor. The control part 80 calculates a traveling distance of the robot cleaner 10 by use of a rotation number of the encoder.

The obstacle detection sensor 33 comprises an infrared ray emitting element and an infrared ray receiving element for receiving the reflected infrared ray, which are paired in substantially perpendicular relation along the inner surface of outer circumference of the cleaner body 11. On the other hand, the obstacle detection sensor 33 may be an ultrasonic wave sensor that emits an ultrasonic wave and receives the reflected ultrasonic wave. The obstacle detection sensor 33 can be utilized to measure a distance from an obstacle or a wall.

The upper camera 42 is mounted on the cleaner body 11 to photograph an image above, and outputs the photographed image to the control part 80. The front camera 41 is mounted on front side of the cleaner body 11 to photograph an image in front of the cleaner body 11, and outputs the photographed image to the control part 80. The front camera 41 is optionally mounted as necessary. For example, the front camera 41 may be mounted to detect an obstacle in the front or an identification mark (not shown) of a recharging station. A CCD camera may be used for the front camera 41 and the upper camera 42.

The driving part 50 comprises two driving wheels disposed at the front sides, two driven wheels disposed at the rear sides, a pair of driving motors for driving each of the two driving wheels, and a power transmitting means for transmitting a power of the driving wheels to the driven wheels. The power transmitting means consists of a timing belt and a pulley. Additionally, the power transmitting means may consist of a gear. The two driving wheels are mounted at a lower portion of the cleaner body 11 to set both center axes on a line. Each of driving motors of driving part 50 is independently driven according to a control signal of the control part 80 to rotate forward or backward. The traveling direction can be controlled by changing a RPM of each of driving motors.

The sending/receiving part 60 sends out data via an antenna 61, and transmits signal received via the antenna 61 to the control part 80. As such, the robot cleaner 10 can send and receive signal to and from an external device 90. The external device 90 may be a computer system installed with a program for monitoring and controlling a movement of the robot cleaner 10 or a remote controller for controlling a robot cleaner from a remote distance. To reduce processing capacity of the control part 80 of the robot cleaner 10, an external device 90 such as a computer system may perform calculation to compensate output value of the gyro sensor 31 by use of image data of the upper camera 42. In this system, the control part 80 of the robot cleaner 10 sends image data of the upper camera 42 via the sending/receiving part 60 to the external device 90, and receives the processing result from the external device 90 to compensate the output value of the gyro sensor 31.

The power part 70 consists of rechargeable battery, which stores power fed from the recharging station (not shown), and supplies power to each component of the robot cleaner 10 such that the robot cleaner 10 can autonomously travel and clean.

The control part 80 processes signal received from the sending/receiving part 60, and controls each component of the robot cleaner 10 to perform instructed works. The control part 80 determines a working area of the robot cleaner 10 by traveling along a wall or obstacles by use of the obstacle detection sensor 32 and stores the determined working area at the memory device 81, or the control part 80 stores a working area received from a user at the memory device 81. The control part 80 calculates a traveling path which can efficiently travels in a traveling area stored at the memory device 81. The control part 80 then controls the driving part 50 and the dust-suction part 20 to travel the traveling path and clean by use of the traveling distance detection sensor 33 and the angle sensor 31. The control part 80 controls the driving part 50 to return the robot cleaner 10 to a reference position or a recharging station when cleaning work is completed or recharging is necessary. In other words, the control part 80 controls the robot cleaner 10 to return to a reference position or a recharging station by identifying a position using a front camera 41, an upper camera 42 or an ultrasonic sensor. This will not be described in detail because this is not important part of the present invention.

The control part 80 determines if the robot cleaner 10 travels greater than a compensation reference during cleaning. If so, the control part 80 discontinues the cleaning and changes to a compensation mode to compensate the output value of the gyro sensor 31. The reference of compensation for determining a period of compensating the gyro sensor 31 can be determined based on various references. For example, the reference can be based on time while the robot cleaner 10 leaves the recharging station to perform cleaning, or the whole traveling distance of the robot cleaner 10 during cleaning. In order to compensate the gyro sensor 31, however, the reference of compensation may be based on accumulated rotation angles of the robot cleaner 10 during cleaning. A user may arbitrarily input the reference of compensation to the control part 80 in view of accuracy of the gyro sensor 31 or slide of the robot cleaner 10 during rotation.

When the robot cleaner 10 changes to a compensation mode, the control part 80 photographs the ceiling above the robot cleaner 10 by use of the upper camera 42, determines traveling path of the robot cleaner 10 for compensation by use of the photographed image data, and compensates the output values of the gyro sensor 31 by use of the traveling path.

The method for compensating gyro sensor of robot cleaner according to an embodiment of the present invention will be explained hereinafter in reference with FIGS. 3 to 5.

First, the robot cleaner 10 stands-by at the same reference position as the recharging station. The robot cleaner 10 memorizes the area to be cleaned, and completes calculating the traveling path for efficient cleaning.

The robot cleaner 10 departs from the reference position in response to a working start signal and travels along the traveling path to perform cleaning.

The control part 80 determines if the robot cleaner 10 travels greater than the compensation reference during cleaning. If so, the control part 80 discontinues the work of the robot cleaner 10 and changes to a compensation mode (S10). The compensation reference is accumulated angles of the robot cleaner 10, which are the sum of rotation angles during cleaning. A user inputs the compensation reference of the accumulated angles to the memory device 81 by use of a key input means (not shown) or the external device 90.

When the robot cleaner 10 changes to the compensation mode, the control part 80 compensates output value of the gyro sensor 31 by use of the upper camera 42. The step for the control part 80 of compensating the gyro sensor 31 (S20) by use of the upper camera 42 will be in detail explained hereinafter.

First, the control part 80 controls the driving part 50 to stop the robot cleaner 10. An image 1 of ceiling 2 is captured by the upper camera 42. The control part 80 determines the present position of the robot cleaner 10 by use of the image data transmitted from the upper camera 42, and determines a path P to be traveled for compensating the gyro sensor 31. Various, well-known image processing techniques can be applied for the control part 80 to determine the traveling path P from the image data. For example, the control part 80 may extract marking points from the image data to determine the traveling path P. The marking points can be equipments such as fluorescent lamp, fire sensor and lamp. Alternatively, the marking points can be position identification marks separately formed for position identification by a camera. Various, well-known methods may be applied to extract the marking points from the photographed image. For example, the photographed image may be converted to a gray level, pixel points having similar values are connected, and then a pixel area distinguished from surrounding areas is determined as the marking point. Additionally, an image data distribution status with respect to marking points may be in advance memorized, and an image area having a similar distribution as the memorized the image data distribute status of the marking points may be determined as the marking point.

Figure 5:
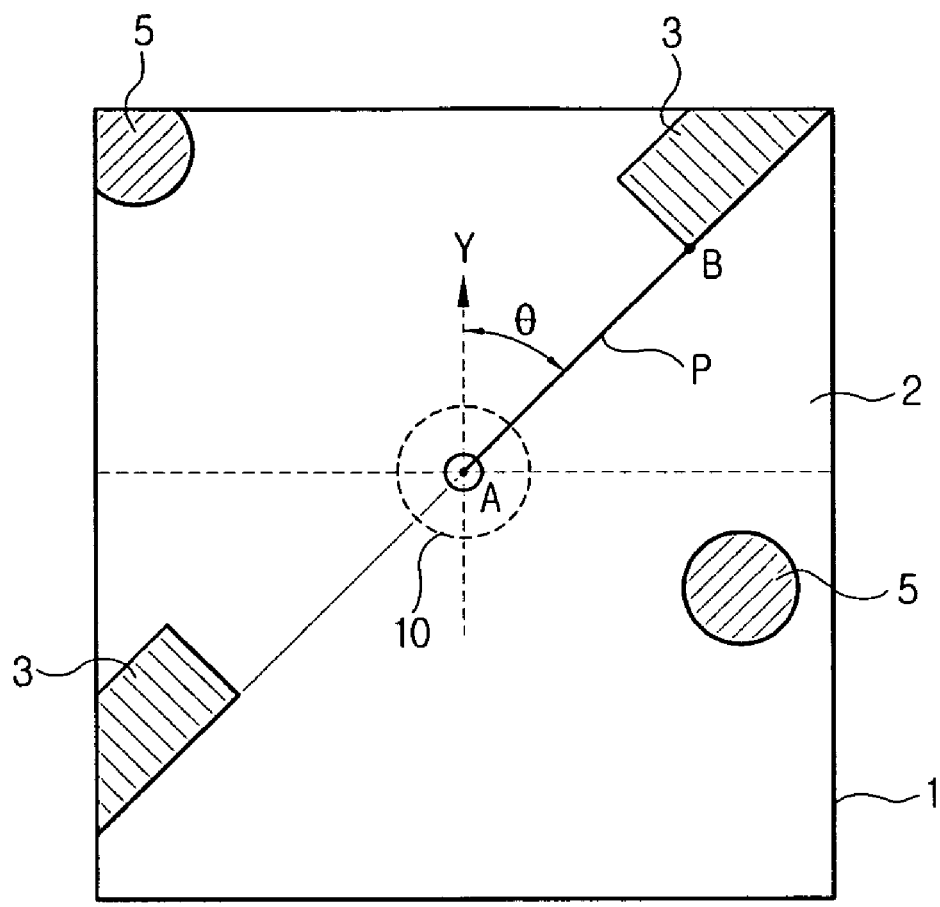
FIG. 5 is a conceptual view of a ceiling image photographed by an upper camera of robot cleaner.

FIG. 5 shows an example of the image 1 photographed by the upper camera 42. The control part 80 extracts marking points from the photographed image 1 by the image processing method as above, and selects a present position and a traveling destination which is a certain distance away from the present position of the robot cleaner 10 by use of the marking point. In FIG. 5, the point B corresponding an edge of the fluorescent lamp 3 is selected as the traveling destination. The traveling destination B is selected to have a certain angle between a line P (hereinafter called as 'traveling path') connecting the traveling destination B and the present position A of the robot cleaner 10 and the previous traveling direction Y of the robot cleaner 10. The angle between the traveling path P and the traveling direction Y of the robot cleaner 10 may be less than approximately ±180° but preferable less than approximately ±90°. The control part 80 stores at the memory device 81 the angle θ of the traveling path P with respect to the previous traveling direction Y of the robot cleaner 10 (S21).

The control part 80 controls the driving part 50 to move to the traveling destination B. The control part 80 determines whether the robot cleaner 10 reaches the traveling destination B, by use of the image data photographed by the upper camera 42. The control part 80 reads output value of the gyro sensor 31 during traveling of the robot cleaner 10 to calculate the angle θ' of the traveling path P by the gyro sensor 31 (S22).

The control part 80 calculates by use of the below equation 1 a difference (Δθ) between the angle θ of traveling path P calculated from image data of the upper camera 10 and the angle θ' of traveling path P calculated from the gyro sensor 31 to store the result at the memory device (S23).

$$\theta - \theta' = \Delta\theta \quad \text{[Equation 1]}$$

If the angle θ of traveling path P calculated by use of the upper camera 42 is greater than the angle θ' of traveling path P calculated from the gyro sensor 31, the difference Δθ between both angles is positive, and if the angle θ of traveling path P calculated by use of the upper camera 42 is less than the angle θ' of traveling path P calculated from the gyro sensor 31, the difference Δθ between both angles is negative.

The control part 80 sets up the stored difference Δθ between both angles of traveling path P as a compensation value of the gyro sensor 31 (S24). As such, when the control part 80 calculates a rotation angle of the robot cleaner 10 by use of the gyro sensor 31, the control part 80 always recognizes the value as an actual rotation angle of the robot cleaner 10, which is subtracted the stored difference Δθ between both angles from the angle calculated from output value of the gyro sensor 31.

The control part 80 controls the driving part 50 of the robot cleaner 10 to return the robot cleaner 10 to the position A where the robot cleaner 10 stopped operating to travel to the traveling destination B. If the robot cleaner 10 returns to the previous working position A, the control part 80 discontinues the compensation mode for the robot cleaner 10 and continues working.

The control part 80 determines, at a certain time interval, if the robot cleaner 10 travels greater than the compensation reference during cleaning. If the robot cleaner 10 travels greater than the compensation reference, the robot cleaner stops cleaning and performs again the compensation mode (S10).

As described above, the robot cleaner 10 according to the method for compensating gyro sensor 31 of the present invention performs a compensation mode to compensate an angle error by the gyro sensor 31 if the robot cleaner 10 travels greater than a compensation reference. Therefore, errors of the gyro sensor 31 are not accumulated such that the traveling accuracy is improved. Additionally, there are no uncleaned areas caused due to traveling inaccuracy of the robot cleaner 10.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of compensating for error in an output value of a gyro sensor of a robot cleaner, comprising:
   changing to a compensation mode if a sum of angles of rotation of the robot cleaner measured by the gyro sensor during a cleaning operation is more than a compensation reference amount; and
   compensating for the error in the output value of the gyro sensor by use of an upper camera.

2. The method according to claim 1, wherein the compensating step comprises:
   determining a traveling path by use of the upper camera;
   calculating a first angle between the traveling path and a previous traveling direction;
   calculating a second angle of the traveling path from the output value of the gyro sensor during traveling the traveling path by use of the upper camera;
   calculating a difference between the first angle of the traveling path and the second angle of the traveling path; and
   compensating for the error in the output value of the gyro sensor by use of the difference.

3. The method according to claim 2, wherein the determining the traveling path step comprises extracting a marking point corresponding to objects on a ceiling from a ceiling image photographed by the upper camera and selecting a present position and a traveling destination of the robot cleaner by use of the marking point.

4. The method according to claim 3, wherein the traveling destination is selected to have a certain angle with respect to a previous traveling direction of the robot cleaner.

5. The method according to claim 4, wherein the certain angle is less than approximately ±90°.

6. A method of controlling a robot cleaner, comprising:
   calculating a planned traveling path for cleaning of an area to be cleaned;
   controlling the robot cleaner to travel along the planned traveling path by moving the robot cleaner through angles of rotation based on an output value of a gyro sensor of the robot cleaner; and
   determining a compensation value for the output value of the gyro sensor if a sum of the angles of rotation measured by the gyro sensor during a cleaning operation is greater than a compensation reference amount, the compensation value being based at least in part on an image taken by an upper camera of the robot cleaner.

7. The method of claim 6, wherein determining the compensation value comprises the steps of:
   determining a first angle between a current traveling direction (Y) and a desired traveling direction (P) via the image;
   reading the output value of the gyro sensor during movement of the robot cleaner along the desired traveling direction to calculate a second angle;
   determining an angular difference between the first angle and the second angle; and
   setting the angular difference as the compensation value.

8. The method of claim 7, wherein determining the first angle comprises:
   extracting a marking point from the image; and
   selecting a present position of the robot cleaner and a traveling destination of the robot cleaner from the marking point, wherein the desired traveling direction is defined between the present position and the traveling destination.

9. The method of claim 8, further comprising selecting the traveling destination so that the first angle is less than approximately ±180°.

10. The method of claim 8, further comprising selecting the traveling destination so that the first angle is less than approximately ±90°.

11. The method of claim 6, wherein the compensation reference is input into the robot cleaner by a user.

12. The method of claim 6, wherein determining the compensation value comprises transmitting a signal from the robot cleaner to an external device so that the external device can determine the compensation value.

* * * * *